United States Patent
Kim et al.

(10) Patent No.: US 8,841,031 B2
(45) Date of Patent: *Sep. 23, 2014

(54) SURFACE-TREATED MICROPOROUS MEMBRANE AND ELECTROCHEMICAL DEVICE PREPARED THEREBY

(75) Inventors: Seok Koo Kim, Daejeon (KR); Sang Young Lee, Daejeon (KR); Soon Ho Ahn, Daejeon (KR); Jung Don Suk, Daejeon (KR); Hyun Hang Yong, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/721,020

(22) PCT Filed: Dec. 7, 2005

(86) PCT No.: PCT/KR2005/004174
§ 371 (c)(1),
(2), (4) Date: Jun. 6, 2007

(87) PCT Pub. No.: WO2006/062349
PCT Pub. Date: Jun. 15, 2006

(65) Prior Publication Data
US 2009/0291360 A1    Nov. 26, 2009

(30) Foreign Application Priority Data
Dec. 7, 2004   (KR) .................. 10-2004-0102535

(51) Int. Cl.
*H01M 2/16* (2006.01)
*H01M 2/18* (2006.01)
*H01M 10/0525* (2010.01)

(52) U.S. Cl.
CPC .............. *H01M 2/1653* (2013.01); *Y02E 60/12* (2013.01); *H01M 2/162* (2013.01); *H01M 2/1633* (2013.01); *H01M 2/166* (2013.01); *H01M 2/1686* (2013.01); *H01M 2/168* (2013.01); *H01M 10/0525* (2013.01)
USPC ........... 429/251; 429/144; 429/145; 429/249; 429/252; 429/253; 429/254

(58) Field of Classification Search
USPC .......... 429/145, 144, 249, 251, 252, 253, 254
See application file for complete search history.

(56) References Cited

U.S. PATENT DOCUMENTS 3,767,607 A * 10/1973 Dorris ........................ 523/216
5,728,482 A    3/1998 Kawakami et al.
(Continued)

FOREIGN PATENT DOCUMENTS

EP    1 115 166 A1    7/2001
JP    11-80395 A    3/1999
(Continued)

OTHER PUBLICATIONS

Matsunami et al., Machine translation of JP 2000-208123 A, Jul. 2000.*
(Continued)

*Primary Examiner* — Sean P Cullen
(74) *Attorney, Agent, or Firm* — Birch, Stewart, Kolasch & Birch, LLP.

(57) ABSTRACT

Disclosed is a porous film comprising: (a) a porous substrate having pores; and (b) a coating layer formed on at least one region selected from the group consisting of a surface of the substrate and a part of the pores present in the substrate, wherein the coating layer comprises styrene-butadiene rubber. An electrochemical device using the porous film as a separator is also disclosed. The porous film is coated with a styrene-butadiene polymer, whose rubbery characteristics can be controlled, and thus provides improved scratch resistance and adhesion to other substrates. When the porous film is used as a separator for an electrochemical device, it is possible to improve the safety of the electrochemical device and to prevent degradation in the quality of the electrochemical device.

16 Claims, 3 Drawing Sheets

(56) References Cited

U.S. PATENT DOCUMENTS

| | | |
|---|---|---|
| 6,287,720 B1 | 9/2001 | Yamashita et al. |
| 6,432,586 B1 * | 8/2002 | Zhang ............................ 429/251 |
| 6,544,682 B1 | 4/2003 | Takami et al. |
| 2003/0104273 A1 | 6/2003 | Lee et al. |
| 2003/0157408 A1 * | 8/2003 | Sun ................................ 429/249 |
| 2005/0095504 A1 * | 5/2005 | Kim et al. ...................... 429/246 |
| 2005/0158624 A1 | 7/2005 | Park et al. |
| 2006/0078791 A1 | 4/2006 | Hennige et al. |
| 2006/0188785 A1 * | 8/2006 | Inoue et al. ................... 429/246 |

FOREIGN PATENT DOCUMENTS

| | | |
|---|---|---|
| JP | 2000208123 A * | 7/2000 |
| JP | 2000256491 A * | 9/2000 |
| JP | 2004189918 | 7/2004 |
| JP | 2004-227972 A | 8/2004 |
| JP | 2004273282 | 9/2004 |
| KR | 10-2001-0095623 A | 11/2001 |
| KR | 1020030034427 | 5/2003 |
| KR | 1020030065074 | 8/2003 |
| KR | 1020030065089 | 8/2003 |
| RU | 2025001 C1 | 12/1994 |
| RU | 2107360 C1 | 3/1998 |
| SU | 942191 A1 | 7/1982 |
| TW | 499775 B | 8/2002 |
| TW | 554560 B | 9/2003 |
| WO | 0036670 | 6/2000 |
| WO | 03/065481 A1 | 8/2003 |
| WO | WO 03065481 A1 * | 8/2003 |
| WO | WO 2004/049471 A2 | 6/2004 |
| WO | WO 2004/049471 A3 | 6/2004 |

OTHER PUBLICATIONS

Nomi et al., Machine translation of JP 2000-256491 A, Sep. 2000.*
Office Action issued by the Chinese Patent Office on Jul. 25, 2008 for Chinese Patent Application No. 200580042056.2 (claiming priority from Korean Patent Application No. 10-2004-0102535).
Written Opinion dated Mar. 29, 2006 for Application No. PCT/KR2005/004174.
International Search Report dated Mar. 29, 2006 for Application No. PCT/KR2004/004174.
Korean Office Action dated Apr. 30, 2007 for Application No. 10-2005-0118233.
European Search Report issued in the corresponding European Patent Application No. 05 821 422.2-1227/1834367; PCT/KR2005004174 on Feb. 19, 2010 (claiming priority from Korean Patent Application No. 10-2004-0102535).

* cited by examiner

SURFACE-TREATED MICROPOROUS MEMBRANE AND ELECTROCHEMICAL DEVICE PREPARED THEREBY

TECHNICAL FIELD

The present invention relates to a porous film, surfaced-treated with a polymer capable of improving adhesion to other substrates, scratch resistance and wear resistance. The present invention also relates to an electrochemical device comprising the above porous film as a separator.

BACKGROUND ART

Recently, there is increasing interest in energy storage technology. Batteries have been widely used as energy sources in portable phones, camcorders, notebook computers, PCs and electric cars, resulting in intensive research and development for them. In this regard, electrochemical devices are subjects of great interest. Particularly, development of rechargeable secondary batteries has been the focus of attention.

Among the currently available secondary batteries, lithium secondary batteries, developed in the early 1990's, have a drive voltage and energy density higher than those of conventional batteries using aqueous electrolytes (such as Ni-MH batteries, Ni—Cd batteries and $H_2SO_4$—Pb batteries). Lithium secondary batteries have been spotlighted due to the above-mentioned advantages. In general, a lithium secondary battery is manufactured by forming an assembly of an anode, a cathode, and a separator interposed between both electrodes. In the above assembly, the separator interposed between both electrodes of the battery is a member that serves to prevent an internal short circuit caused by direct contact between the cathode and anode. Also, the separator serves as an ion flow path in the battery, and contributes to the improvement of battery safety.

However, conventional batteries, manufactured in the same manner as described above by using a polyolefin-based separator, frequently cause the problems of poor adhesion and separation between a separator and electrodes, and inefficient lithium ion transfer through the pores of the separator, resulting in degradation in the quality of a battery. Additionally, conventional separators are formed from a chemically stable material, which is not decomposed and does not allow any reaction upon exposure to the oxidative or reductive atmosphere inside a battery, such as polyolefin or fluoropolymer. However, such materials provide insufficient mechanical strength, and thus cause the problems of peel-off or breakage of a separator during the assemblage of a battery, resulting in a drop in the battery safety, caused by an internal short circuit of the battery. Further, conventional separators are coated with inorganic particles in order to improve the heat resistance and to provide a high dielectric constant. However, due to the poor binding force between the separator and inorganic particles, the particles are detached from the separator, and thus it is not possible to obtain desired effects.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
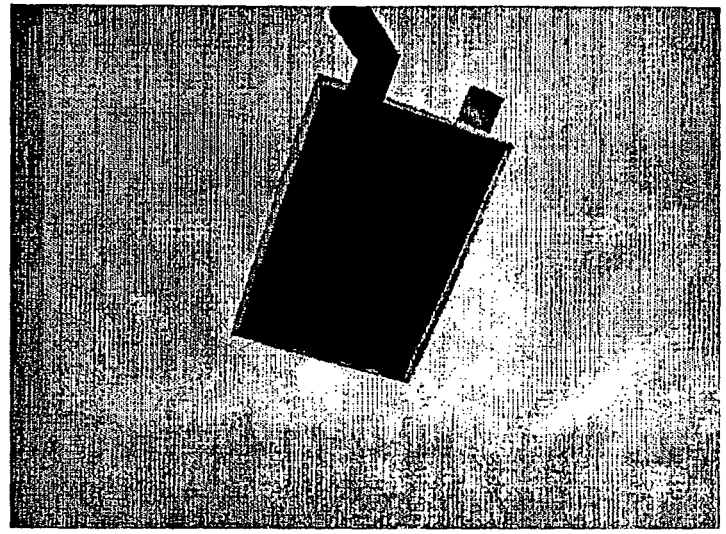
FIG. 1 is a photograph showing the results of evaluation for the adhesion between an electrode and the organic/inorganic composite porous film ($BaTiO_3$/PVdF-HFP) coated with styrene-butadiene rubber (SBR) according to Example 1, after laminating the electrode and the porous film.

Therefore, the present invention has been made in view of the above-mentioned problems. The present inventors have found that when a separator is overcoated with styrene-butadiene rubber (SER) that imparts excellent adhesion and mechanical strength, on a surface of the separator, or on a part of pores present in the separator, the separator shows improved adhesion to other substrates, preferably to electrodes, and is prevented from peeling-off and breaking during the assemblage of an electrochemical device, so that an electrochemical device using the same separator can provide improved safety and can be prevented from degradation in the quality.

Therefore, it is an object of the present invention to provide a porous film coated with styrene-butadiene rubber having excellent adhesion and mechanical strength. It is another object of the present invention to provide a method for manufacturing the above porous film. It is still another object of the present invention to provide an electrochemical device using the above porous film as a separator.

According to an aspect of the present invention, there is provided a porous film comprising: (a) a porous substrate having pores; and (b) a coating layer formed on at least one region selected from the group consisting of a surface of the substrate and a part of the pores present in the substrate, wherein the coating layer comprises styrene-butadiene rubber. The present invention also provides an electrochemical device using the above porous film as a separator.

Hereinafter, the present invention will be explained in more detail.

The porous film according to the present invention is characterized in that the surface of the porous substrate and/or a part of the pores present in the substrate is coated with styrene-butadiene rubber. Such coated porous film can improve the safety of a battery and prevent degradation in the quality of a battery by virtue of the physical properties of styrene-butadiene rubber.

(1) The porous film coated with styrene-butadiene rubber on the surface of the porous substrate having pores and/or on a part of the pores present in the porous substrate can improve the safety of a battery.

As described above, conventional separators generally use polyolefin polymers. However, polyolefin polymers have insufficient mechanical strength, and thus cause the problems of peel-off and breakage of separators during the assemblage of a battery, resulting in degradation in the safety of a battery, caused by an internal short circuit, or the like.

On the contrary, the porous film according to the present invention has improved scratch resistance and maintains the pore structure present in the film over a longer period of time, by virtue of the rubbery characteristics provided by low glass transition temperature (Tg) of styrene-butadiene rubber. Therefore, an electrochemical device comprising the porous film as a separator can provide improved safety.

Additionally, when the styrene-butadiene rubber used in the porous film comprises a hydrophilic functional group, the porous film can show more improved adhesion. Hence, the porous film according to the present invention maintains to be in close contact with other substrates (e.g. electrodes) continuously, so that both electrodes can be prevented from being in direct contact with each other due to a drop in external stress and degradation in the thermal safety of a separator, caused by internal or external factors. Therefore, it is possible to prevent an internal short circuit.

Further, as described above, when inorganic particles are dispersed or coated on a conventional polyolefin-based separator in order to improve the heat resistance and conductivity, the inorganic particles coated on the separator are detached from the separator, and thus it is not possible to obtain desired effects. However, in the porous film according to the present invention, a styrene-butadiene rubber coating layer is introduced onto an organic/inorganic composite porous film having a pore structure formed by interstitial volumes of the inorganic particles, while maintaining the pore structure as it is. Therefore, it is possible to realize excellent adhesive property provided by styrene-butadiene rubber, while maintaining the effects of improving heat resistance and mechanical strength, provided by the inorganic particles. Particularly, when styrene-butadiene rubber is coated on the surface of the porous film and infiltrates into a part of the pores present in the film, it is possible to generate synergy of the above effects.

(2) The porous film coated with styrene-butadiene rubber on the surface of the porous substrate having pores and/or on a part of the pores present in the porous substrate can prevent degradation in the quality of a battery.

In a conventional process for assembling a battery, for example, by interposing a separator between a cathode and an anode of a battery, the electrodes and separator are frequently separated from each other due to poor adhesion between them. Thus, during the electrochemical reaction in the battery, lithium ion transfer cannot be performed efficiently through the pores of the separator, resulting in degradation in the quality of a battery.

However, in the porous film coated with styrene-butadiene rubber according to the present invention, it is possible to provide excellent adhesion by controlling the kinds and amounts of monomers during the preparation of the styrene-butadiene rubber. Therefore, continuous lithium ion transfer can be maintained, during the electrochemical reaction in the battery as well as the process for assembling a battery, due to the close contact between the porous film and electrodes, so that degradation in the battery quality can be prevented.

(3) The porous film according to the present invention is obtained by coating (i) a porous substrate having pores; (ii) an organic/inorganic composite porous film, which comprises a porous film having pores, coated with a coating layer comprising a mixture of inorganic particles with a binder polymer, on the surface of the porous substrate and/or on a part of the pores present in the porous substrate; and (iii) an organic/inorganic composite porous film comprising inorganic particles and a binder polymer coating layer partially or totally formed on the surface of the inorganic particles, directly with styrene-butadiene rubber. Hence, the inorganic particles are linked and fixed among themselves by the pores present on the surface of the porous substrate and the binder polymer. Additionally, interstitial volumes of the inorganic particles permit the pore structure of the active layer type or freestanding type organic/inorganic composite porous film to be maintained as it is, and the pore structure and the styrene-butadiene rubber coating layer are bonded physically and firmly with each other. Therefore, it is possible to solve the problem of poor mechanical properties, such as brittleness. Additionally, a liquid electrolyte, injected through the pore structure subsequently, significantly reduces the interfacial resistance generated among the inorganic particles and between the inorganic particles and the binder polymer. Further, smooth lithium ion transfer can be accomplished through the pores and a larger amount of electrolyte can be injected through the pore structure, resulting in improvement of the battery quality.

In addition to the above advantages, a separator using the porous film according to the present invention can be prevented from peeling-off and breaking. Hence, it is possible to increase the processability during the assemblage of a battery.

The coating materials for the porous film according to the present invention include styrene-butadiene rubber known to one skilled in the art, with no particular limitation. Styrene-butadiene rubber (SBR) is preferred because it shows a low infiltration ratio to an electrolyte, and thus has little possibility of dissolution or deformation inside a battery. Particularly, SBR having a glass transition temperature (Tg) of room temperature (25° C.) or less is preferred.

Styrene-butadiene rubber (SBR) can be controlled in terms of physical properties so as to be present in a glassy state or rubbery state by adjusting the mixing ratio of a styrene group-containing monomer and a butadiene group-containing monomer, and thus helps to improve the scratch resistance of a separator and safety of a battery. Additionally, SBR may comprise various kinds and amounts of monomers having hydrophilic functional groups that can form hydrogen bonds with other substrates (e.g. electrodes) to increase the adhesion. Therefore, SBR can provide improved adhesion to an electrode. Considering the above characteristics, SBR that may be used in the present invention preferably has at least one hydrophilic functional group selected from the group consisting of maleic acid, acrylic acid, acrylate, carboxylate, nitrile, hydroxy, mercapto, ether, ester, amide, amine and acetate groups, and halogen atoms.

Styrene-butadiene rubber that may be used in the present invention includes, but is not limited to, SBR obtained by polymerizing: (a) a butadiene group-containing monomer and a styrene group-containing monomer; or (b) a butadiene group-containing monomer, a styrene group-containing monomer and a hydrophilic group-containing monomer known to one skilled in the art, in a conventional manner currently used in the art. There is no particular limitation in the hydrophilic group-containing monomer, and non-limiting examples thereof include monomers containing at least one hydrophilic functional group selected from the group consisting of maleic acid, acrylic acid, acrylate, carboxylic acid, nitrile, hydroxyl and acetate groups.

Herein, the mixing ratio of the styrene group-containing monomer to the butadiene group-containing monomer ranges from 1:99 to 99:1, but is not limited thereto. Preferably, the styrene-butadiene rubber has a styrene group content of 50 wt % or less.

Although there is no particular limitation in the average molecular weight (MW) of the styrene-butadiene rubber, SBR preferably has a molecular weight of 10,000~1,000,000. Also, there is no particular limitation in the form of SBR rubber, SBR rubber is present preferably in the form of an emulsion obtained by solution copolymerization. Because SBR may be used directly in the form of an emulsion or after dispersing it into water, an additional organic solvent and an additional step for removing the same are not required.

The SBR coating layer formed on the porous film preferably has a thickness of 0.001~10 micrometers, but is not limited thereto. If the thickness is less than 0.001 μm, it is not possible to improve the adhesion and mechanical strength sufficiently. On the other hand, if the thickness is greater than 10 μm, the SBR coating layer may serve as a resistance layer, resulting in degradation in the quality of a battery.

The coating layer formed on the porous film according to the present invention may further comprise other additives known to one skilled in the art, in addition to SBR. Non-limiting examples of such additives include a thickening agent or a silane coupling agent that can enhance the binding force.

The substrate to be coated with SBR according to the present invention includes any porous substrate as long as it serves as a lithium ion flow path and as a space for receiving an electrolyte, regardless of the constitutional elements and composition of the substrate.

The porous substrate may be classified broadly into the following three types, but is not limited thereto. The first type is (a) a conventional separator known to one skilled in the art. The second type is (b) an organic/inorganic composite porous film, which comprises a porous film having pores, coated with a coating layer comprising a mixture of inorganic particles with a binder polymer, on the surface of the porous substrate and/or on a part of the pores present in the porous substrate. The third type is (c) organic/inorganic composite porous film comprising inorganic particles and a binder polymer coating layer partially or totally formed on the surface of the inorganic particles. Combinations of the above types of separators may be used. Herein, the inorganic/organic composite porous films (b) and (c) comprise the inorganic particles linked and fixed among themselves by the binder polymer, and have a pore structure formed by interstitial volumes of the inorganic particles. Particularly, the inorganic/organic composite porous films (b) and (c) are preferred, because such porous films have little possibility of a complete short circuit between both electrode due to the presence of the inorganic particles, even if the styrene-butadiene surface coating layer is partially or totally broken in a battery by the external or internal factors. Even if any short circuit is generated, the short circuit zone is inhibited from being extended by the inorganic particles, resulting in improvement of the safety of a battery.

In cases of the separator (a) and organic/inorganic composite porous film (b), non-limiting examples of the porous substrate include polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene, polyvinylidene fluoride, polyethylene oxide, polyacrylonitrile, polyvinylidene fluoride-hexafluoropropylene copolymer, polyethylene, polypropylene, or combinations thereof. However, other polyolefin-based substrates known to one skilled in the art may be used.

The porous substrate used in the separator (a) and the organic/inorganic composite porous film (b) may take the form of a membrane or fiber. When the porous substrate is fibrous, it may be a nonwoven web forming a porous web (preferably, spunbond type web comprising long fibers or melt blown type web).

Although there is no particular limitation in the thickness of the porous substrate used in the separator (a) and the organic/inorganic composite porous film (b), the porous substrate preferably has a thickness of between 1 μm and 100 μm, more preferably of between 5 an and 50 μm. Although there is no particular limitation in the pore size and porosity of the porous substrate, the porous substrate preferably has a porosity of between 5% and 99%. The pore size (diameter) preferably ranges from 0.01 μm to 50 μm, more preferably from 0.1 μm to 20 μm.

Among the above-described three types of porous substrates, the organic/inorganic composite porous film (b) comprises a porous substrate having pores, coated with a mixture of inorganic particles with a binder polymer, while the organic/inorganic composite porous film (c) is a free standing film comprising inorganic particles and a binder polymer. These types of porous substrates permit interstitial volumes to be formed among the inorganic particles, thereby serving to form micropores and to maintain the physical shape as a spacer. Herein, the binder polymer serves to fix the inorganic particles and link the inorganic particles among themselves.

There is no particular limitation in selection of the inorganic particles, as long as they are electrochemically stable. In other words, there is no particular limitation in the inorganic particles that may be used in the present invention, as long as they are not subjected to oxidation and/or reduction at the range of drive voltages (for example, 0-5 V based on $Li/Li^+$) of a battery, to which they are applied. Particularly, it is preferable to use inorganic particles having ion conductivity as high as possible, because such inorganic particles can improve the quality of an electrochemical device by increasing the ion conductivity in an electrochemical device. Additionally, when inorganic particles having a high density are used, they are not readily dispersed during a coating step and may increase the weight of a battery to be manufactured. Therefore, it is preferable to use inorganic particles having a density as low as possible. Further, when inorganic particles having a high dielectric constant are used, they can contribute to increase the dissociation degree of an electrolyte salt in a liquid electrolyte, such as a lithium salt, thereby improving the ion conductivity of the electrolyte. Further, because the inorganic particles are characterized by their physical properties that are not changed even at a high temperature of 200° C. or higher, the organic/inorganic composite porous film using the inorganic particles can have excellent heat resistance.

For these reasons, the inorganic particles that may be used in the organic/inorganic composite porous films (b) and (c) are selected from conventional the inorganic particles having a high dielectric constant of 5 or more, preferably of 10 or more, inorganic particles having lithium conductivity, or mixtures thereof. This is because such inorganic particles can improve the safety of a battery and can prevent degradation in the battery quality due to their heat resistance and conductivity.

Particular non-limiting examples of inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

As used herein, "inorganic particles having lithium ion conductivity" refer to inorganic particles containing lithium elements and having a capability of conducting lithium ions without storing lithium. Inorganic particles having lithium ion conductivity can conduct and transfer lithium ions due to defects present in their structure, and thus can improve lithium ion conductivity and contribute to improve the quality of a battery. Non-limiting examples of such inorganic particles having lithium ion conductivity include: lithium phosphate ($Li_3PO_4$); lithium titanium phosphate ($Li_xTi_y(PO_4)_3$, $0<x<2$, $0<y<3$); lithium aluminum titanium phosphate ($Li_xAl_yTi_z(PO_4)_3$, $0<x<2$, $0<y<1$, $0<z<3$); ($LiAlTiF)_xO_y$ type glass ($0<x<4$, $0<y<13$) such as $14Li_2O-9Al_2O_3-38TiO_2-39P_2O_5$; lithium lanthanum titanate ($Li_xLa_yTiO_3$, $0<x<2$, $0<y<3$); lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$; lithium nitrides ($Li_xN_y$, $0<x<4$, $0<y<2$) such as $Li_3N$; $SiS_2$ type glass ($Li_xSi_yS_z$, $0<x<3$, $0<y<2$, $0<z<4$) such as $Li_3PO_4-Li_2S-SiS_2$; $P_2S_5$ type glass ($Li_xP_yS_z$, $0<x<3$, $0<y<3$, $0<z<7$) such as $LiI-Li_2S-P_2S_5$; or mixtures thereof.

The above-described inorganic particles, for example $Pb(Zr,Ti)O_3$ (PZT), $Pb_{1-x}La_xZr_{1-y}Ti_yO_3$ (PLZT), $Pb(Mg_3Nb_{2/3})O_3-PbTiO_3$ (PMN-PT), hafnia ($HfO_2$), etc., have a high dielectric constant of 100 or more. The inorganic particles also have piezoelectricity, so that an electric potential can be generated between both surfaces by the charge formation, when they are drawn or compressed under the application of a certain pressure. Therefore, the inorganic particles can prevent an internal short circuit between both electrodes, thereby contributing to improve the safety of a battery. Additionally, when such inorganic particles having a high dielectric constant are combined with inorganic particles having lithium ion conductivity, synergic effects can be obtained.

The organic/inorganic composite porous film according to the present invention can form pores having a size of several micrometers by controlling the size of inorganic particles, content of inorganic particles and the mixing ratio of inorganic particles and binder polymer. It is also possible to control the pore size and porosity.

Although there is no particular limitation in the size of the inorganic particles, inorganic particles preferably have a size of 0.01-10 μm. Also, there is no particular limitation in the content of the inorganic particles. However, the inorganic particles are present in the mixture of the inorganic particles with binder polymer forming the organic/inorganic composite porous film, preferably in an amount of 50-99 wt %, more particularly in an amount of 60-95 wt % based on 100 wt % of the total weight of the mixture.

The binder polymer that may be used in the organic/inorganic composite porous films (b) and (c) includes a polymer currently used in the art. It is preferable to use a polymer having a solubility parameter of between 15 and 45 $MPa^{1/2}$, depending on the particular electrolyte to be used in a battery. More preferably, a polymer that is swellable in an electrolyte and having a solubility parameter of between 18.0 and 30 $[J^{1/2}/cm^{3/2}]$ is used. The binder polymer causes the inorganic particles to be linked among them and to be fixed stably. Thus the binder polymer contributes to prevent degradation in the mechanical properties of a final organic/inorganic composite porous film and to increase the infiltration ratio of electrolyte, thereby improving the quality of a battery.

Non-limiting examples of the binder polymer that may be used in the present invention include polyvinylidene fluoride-co-hexafluoropropylene, poly vinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinylalcohol, cyanoethyl cellulose, cyanoethylsucrose, pullulan, carboxymetyl cellulose, or mixtures thereof.

The organic/inorganic composite porous films (a) and (b) may be manufactured by a conventional process known to one skilled in the art. One embodiment of the method comprises the steps of: (a) dissolving a polymer into a solvent to form a polymer solution; (b) adding inorganic particles to the polymer solution obtained from step (a) and mixing them; and (c) coating the mixture of inorganic particles with binder polymer obtained from step (b) on a substrate, followed by drying, and optionally removing the substrate.

The organic/inorganic composite porous film obtained as described above may be provided in the above three types (a)~(c). Among these types, the organic/inorganic composite porous film (c), obtained by using a mixture of inorganic particles with a binder alone, has a micrometer sized pore structure due to the interstitial volumes present among the inorganic particles that function not only as supports but also as spacers. Additionally, the organic/inorganic composite porous film (b) formed by coating the above mixture on a porous substrate comprises pores provided by the porous substrate itself and has pore structures on the substrate as well as on the active layer due to the interstitial volumes present among the inorganic particles on the substrate.

Although there is no particular limitation in the pore size and porosity of a finished porous film, formed by coating styrene-butadiene rubber on any one type of substrate selected from types (a)~(c), the porous film preferably has a porosity of 10~99% and a pore size (diameter) of 0.001~10 μm. If the finished porous film has a pore size of less than 0.001 μm and a porosity of less than 10%, an electrolyte cannot move smoothly through the porous film, resulting in degradation in the quality of a battery. On the other hand, the finished porous film has a pore size of greater than 10 μm and a porosity of greater than 99%, the porous film cannot maintain physical properties, and thus causes possibility of an internal short circuit between a cathode and anode. Also, there is no particular limitation in the thickness of the porous film. However, the porous film preferably has a thickness of 1~100 μm, more preferably of 5~50 μm. If the porous film has a thickness of less than 1 μm, it cannot maintain physical properties. On the other hand, if the porous film has a thickness of greater than 100 μm, it may function as a resistance layer.

In one embodiment of the method for manufacturing a porous film coated with styrene-butadiene rubber, a porous substrate having pores is coated with styrene-butadiene rubber, and then the coated substrate is dried.

Herein, styrene-butadiene rubber may be used in the form of an emulsion. Also, styrene-butadiene rubber may be dispersed into a solvent having a solubility parameter similar to the solubility parameter of the rubber and a low boiling point, preferably into water, and then used.

In order to coat the above three types of porous films with the emulsion of styrene-butadiene rubber, any methods known to one skilled in the art may be used. It is possible to use various processes including dip coating, die coating, roll coating, comma coating or combinations thereof. Additionally, when the mixture containing inorganic particles and polymer is coated on the porous substrate, either or both surfaces of the porous substrate may be coated. The drying step may be performed in a manner generally known to one skilled in the art.

The porous film according to the present invention, obtained as described above, may be used as a separator in an electrochemical device.

Additionally, the present invention provides an electrochemical device comprising a cathode; an anode; the porous film coated with styrene-butadiene rubber according to the present invention; and an electrolyte.

Such electrochemical devices include any devices in which electrochemical reactions occur, and particular examples thereof include all kinds of primary batteries, secondary batteries, fuel cells, solar cells or capacitors. Particularly, the electrochemical device is a lithium secondary battery including a secondary lithium metal battery, secondary lithium ion battery, secondary lithium polymer battery, or a secondary lithium ion polymer battery.

The electrochemical device using the porous film according to the present invention may be manufactured by a conventional method known to one skilled in the art. In one embodiment of the method for manufacturing the electrochemical device, the electrochemical device is assembled by interposing the porous film coated with styrene-butadiene rubber between a cathode and anode to form an assembly, and an electrolyte is injected into the assembly.

Meanwhile, adhesion of the porous film according to the present invention to other substrates (preferably, both electrodes) largely depends on the physical properties of styrene-butadiene rubber used for forming a coating layer. In fact, excellent adhesion can be obtained through high polarity or low glass transition temperature of styrene-butadiene rubber. The porous film according to the present invention is useful for various processes requiring adhesion between an electrode and a separator, including a winding process, lamination or stacking process and a folding process. Therefore, electrochemical devices can be manufactured by way of various types of processes.

The electrode used in the electrochemical device according to the present invention may be formed by applying an electrode active material on a current collector according to a method known to one skilled in the art.

Particularly, cathode active materials may include any conventional cathode active materials currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, anode active materials may include any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof. However, the electrolyte that may be used in the present invention is not limited to the above examples.

More particularly, the electrolyte may be injected in a suitable step during the manufacturing process of an electrochemical device, according to the particular manufacturing process to be used and desired properties of a final product. In other words, electrolyte may be injected, before an electrochemical device is assembled or in a final step during the assemblage of an electrochemical device.

There is no particular limitation in the outer shape of the electrochemical device obtained in the above-described manner. The electrochemical device may be a cylindrical, prismatic, pouch-type or coin-type electrochemical device.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

1-1. Manufacture of Organic/Inorganic Composite Porous Film Coated with SBR

PVdF-HFP copolymer (polyvinylidene fluoride-hexafluoropropylene copolymer) was added to tetrahydrofuran (THF) in the amount of about 5 wt % and dissolved therein at 50° C. for about 12 hours or more to form a polymer solution. To the polymer solution obtained as described above, barium titanate ($BaTiO_3$) powder was added to the concentration of 20 wt % on the solid content basis, so as to be dispersed in the polymer solution. By doing so, a mixed solution ($BaTiO_3$/PVdF-HFP=70/30 (weight percent ratio)) was obtained. Then, the mixed solution obtained as described above was coated on a porous polyethylene terephthalate substrate (porosity: 80%) having a thickness of about 20 μm by using a dip coating process to a coating layer thickness of about 2 μm. After measuring with a porosimeter, the active layer infiltrated into and coated on the porous polyethylene terephthalate substrate had a pore size of 0.4 μm and a porosity of 58%.

The organic/inorganic composite porous film obtained as described above was coated with a solution containing 5 wt % of styrene-butadiene rubber (LG Chem., Ltd.) dispersed therein, by way of dip coating, and then dried. The styrene-butadiene rubber was comprised of styrene (23%), butadiene (67%), nitrile groups (5%) and carboxyl groups (5%).

1-2. Manufacture of Lithium Secondary Battery (Manufacture of Cathode)

To N-methyl-2-pyrrolidone (NMP) as a solvent, 94 wt % of lithium cobalt composite oxide ($LiCoO_2$) as a cathode active material, 43 wt % of carbon black as a conductive agent and 3 wt % of PVDF (polyvinylidene fluoride) as a binder were added to form slurry for a cathode. The slurry was coated on Al foil having a thickness of 20 μm as a cathode collector and dried to form a cathode.

(Manufacture of Anode)

To N-methyl-2-pyrrolidone (NMP) as a solvent, 96 wt % of carbon powder as an anode active material, 3 wt % of PVDF (polyvinylidene fluoride) as a binder and 1 wt % of carbon black as a conductive agent were added to form mixed slurry for an anode. The slurry was coated on Cu foil having a thickness of 10 μm as an anode collector and dried to form an anode.

(Manufacture of Battery)

The cathode and anode obtained as described above were laminated with the organic/inorganic composite porous film obtained as described in Example 1-1 to form an assembly. Then, an electrolyte (ethylene carbonate (EC)/propylene carbonate (PC)/diethyl carbonate (DMC)=30:20:50 (weight percent ratio) containing 1M of lithium hexafluorophosphate (LiPF$_6$)) was injected thereto to provide a lithium secondary battery.

Comparative Example 1

Example 1 was repeated to provide an organic/inorganic composite porous film and a lithium secondary battery, except that the organic/inorganic composite porous film (BaTiO$_3$/PVdF-HFP) was not coated with a solution containing styrene-butadiene rubber dispersed therein.

Experimental Example 1

Evaluation for Binding Capability and Adhesion

The following test was performed to evaluate the binding capability and adhesion of the organic/inorganic composite porous film coated with SBR according to the present invention.

1-1. Evaluation for Adhesion to Other Substrates

Each of the organic/inorganic composite porous films according to Example 1 and Comparative Example 1 was laminated with an electrode, and adhesion between the film and the electrode was evaluated.

Figure 2:
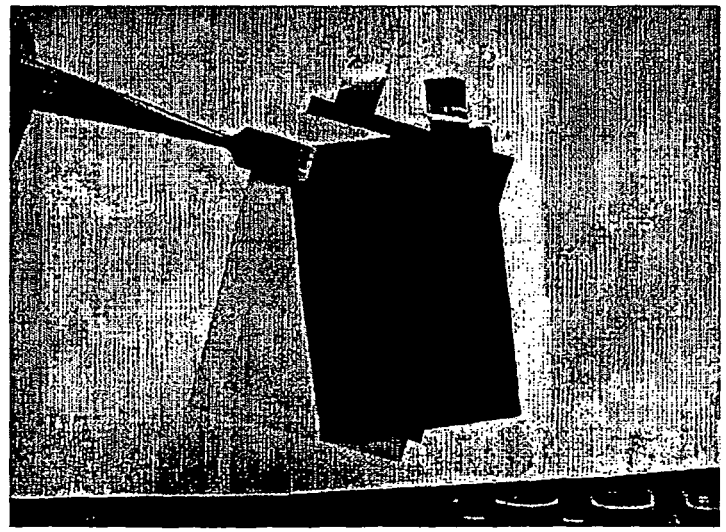
FIG. 2 is a photograph showing the results of evaluation for the adhesion between an electrode and the organic/inorganic composite porous film ($BaTiO_3$/PVdF-HFP) according to Comparative Example 1, after laminating the electrode and the porous film.

After the evaluation, the organic/inorganic composite porous film coated with styrene-butadiene rubber according to the present invention (BaTiO$_3$/PVdF-HFP) showed excellent adhesion to an electrode (see FIG. 1), while the organic/inorganic composite porous film according to Comparative Example 1 showed poor adhesion (see FIG. 2).

1-2. Evaluation for Binding Capability

Each of the organic/inorganic composite porous films according to Example 1 and Comparative Example 1 was used as a sample. To perform a peeling test, a tape available from 3M Company was attached to each film sample, and then detached therefrom.

Figure 3:
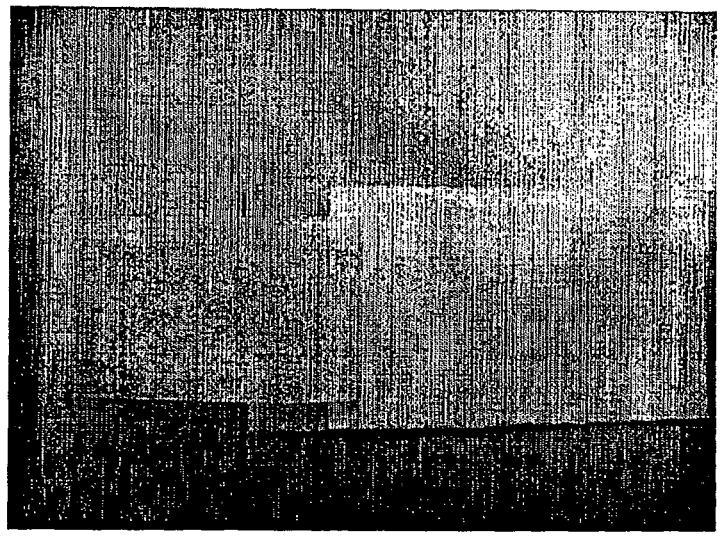
FIG. 3 is a photograph showing the results of the peeling test performed by using the organic/inorganic composite porous film ($BaTiO_3$/PVdF-HFP) coated with styrene-butadiene rubber (SBR) according to Example 1.
Figure 4:
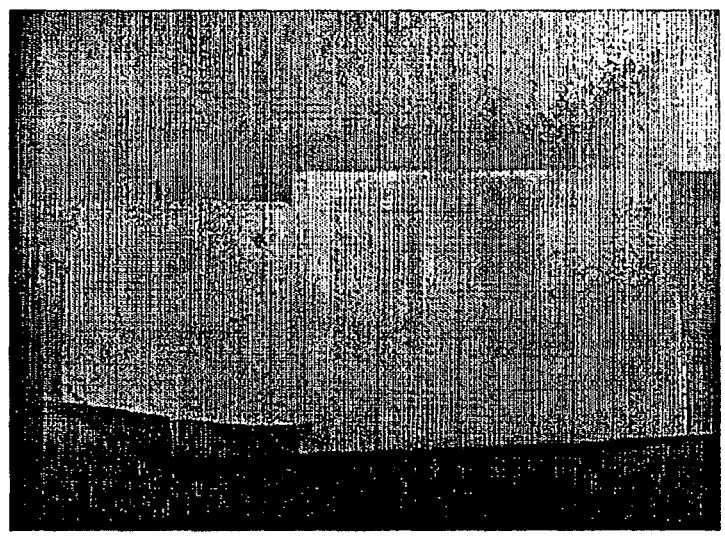
FIG. 4 is a photograph showing the results of the peeling test performed by using the organic/inorganic composite porous film ($BaTiO_3$/PVdF-HFP) according to Comparative Example 1.

After the test, the porous film coated with styrene-butadiene rubber according to the present invention showed significantly improved binding capability among inorganic particles as well as between the polyester substrate and the film (see FIG. 3). On the contrary, the non-coated organic/inorganic composite porous film according to Comparative Example 1 showed poor binding capability (see FIG. 4).

It can be seen from the above results that the organic/inorganic composite porous film coated with styrene-butadiene rubber according to the present invention can provide significantly improved binding capability and adhesion.

INDUSTRIAL APPLICABILITY

As can be seen from the foregoing, the organic/inorganic composite porous film coated with styrene-butadiene rubber, which imparts excellent adhesion and mechanical strength, according to the present invention can provide improved scratch resistance and adhesion to other substrates. Therefore, when the porous film is used in an electrochemical device as a separator, it is possible to improve the safety of the electrochemical device and to prevent degradation in the quality of the electrochemical device.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A battery separator, comprising:
   (a) a porous substrate having pores; and
   (b) a styrene-butadiene layer formed on at least one region selected from the group consisting of a surface of the substrate and a part of the pores present in the substrate, wherein the styrene-butadiene layer comprises styrene-butadiene rubber;
   wherein the porous substrate having pores is selected from the group consisting of:
      (i) an organic/inorganic composite porous film, which comprises a porous film having pores, coated with a coating layer comprising a mixture of inorganic particles with a binder polymer, on a surface of the porous film and on a part of the pores present in the porous film, the inorganic particles linked and fixed among themselves by the binder polymer, and having a pore structure formed by interstitial volumes of the inorganic particles throughout the coating layer, wherein the coating layer restrains the thermal shrinkage of the porous film; and
      (ii) an organic/inorganic composite porous free-standing film comprising inorganic particles and a binder polymer, the inorganic particles linked and fixed among themselves by the binder polymer, and having a pore structure formed by interstitial volumes of the inorganic particles throughout the organic/inorganic composite porous free-standing film;
   wherein the inorganic particles are present in an amount of 50-99 wt % based on 100 wt % of the mixture of the inorganic particles and the binder polymer.

2. The battery separator according to claim 1, which has a pore size of between 0.001 and 10 μm and a porosity of 10~99%.

3. The battery separator according to claim 1, wherein the inorganic particles further comprise inorganic particles having a dielectric constant of 5 or more.

4. The battery separator according to claim 3, wherein the inorganic particles having a dielectric constant of 5 or more are BaTiO$_3$, SrTiO$_3$, SnO$_2$, CeO$_2$, MgO, NiO, CaO, ZnO, ZrO$_2$, Y$_2$O$_3$, Al$_2$O$_3$ or TiO$_2$.

5. The battery separator according to claim 1, wherein the binder polymer has a solubility parameter of between 15 and 45 MPa$^{1/2}$.

6. The battery separator according to claim 1, wherein the binder polymer is at least one selected from the group consisting of polyvinylidene fluoride-co-hexafluoro propylene, polyvinylidene fluoride-co-trichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethylcellulose, cyanoethylsucrose, pullulan, and carboxymetyl cellulose.

7. The battery separator according to claim 1, wherein the styrene-butadiene rubber contains a hydrophilic functional group.

8. The battery separator according to claim 3, wherein the hydrophilic functional group forms a hydrogen bond with other substrates.

9. The battery separator according to claim 1, wherein the styrene-butadiene rubber is obtained by polymerization of:
(a) a butadiene group-containing monomer and a styrene group-containing monomer; or (b) a butadiene group-containing monomer, a styrene group-containing monomer and a hydrophilic group-containing monomer having at least one hydrophilic functional group selected from the group consisting of maleic acid, acrylic acid, acrylate, carboxylic acid, nitrile, hydroxyl, acetate, mercapto, ether, ester, amide, amine groups, and halogen atoms.

10. The battery separator according to claim 1, wherein the styrene-butadiene rubber has an average molecular weight of 10,000~1,000,000.

11. The battery separator according to claim 1, wherein the styrene-butadiene layer has a thickness of 0.001~10 μm.

12. The separator according to claim 1, wherein the porous substrate having pores is (i) the organic/inorganic composite porous film, which comprises the porous film having pores, coated with the coating layer comprising a mixture of inorganic particles with the binder polymer, on the surface of the porous film and/or on part of the pores present in the porous film.

13. The battery separator according to claim 1, wherein the porous substrate comprises at least one material selected from the group consisting of polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene, polyethylene, polypropylene, and polyolefin.

14. The separator according to claim 1, wherein the porous substrate having pores is (ii) the organic/inorganic composite porous free-standing film comprising inorganic particles and the binder polymer.

15. An electrochemical device comprising a cathode, an anode, a separator according to claim 1 and an electrolyte.

16. The electrochemical device according to claim 15, which is a lithium secondary battery.

* * * * *